US006608831B1

(12) United States Patent
Beckstrom et al.

(10) Patent No.: US 6,608,831 B1
(45) Date of Patent: Aug. 19, 2003

(54) BREAKOUT/BREAK-IN HYBRID NETWORK SYSTEM

(75) Inventors: Gary Beckstrom, Sunnyvale, CA (US); Pradip N. Nirmel, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/440,152

(22) Filed: Nov. 15, 1999

Related U.S. Application Data

(60) Provisional application No. 60/144,417, filed on Jul. 16, 1999.

(51) Int. Cl.[7] ................................................ H04L 12/66
(52) U.S. Cl. .................................. 370/352; 370/395.53
(58) Field of Search .............................. 370/351–358, 370/389, 391, 397, 399, 395.52, 395.53, 409

(56) References Cited

PUBLICATIONS

Cisco Technology, Inc., "Voice Network Switching System," published on Mar. 30, 1998, pp. 1–4.
Cisco Technology, Inc., "Introduction to Voice Network Switching," published on Dec. 18, 1997, pp. 1–26.
Cisco Technology, Inc., "Introduction to Voice Network Switching," published on Mar. 30, 1998, pp. 1–27.

*Primary Examiner*—Wellington Chin
*Assistant Examiner*—Brenda Pham

(74) *Attorney, Agent, or Firm*—Marger Johnson & McCollom, PC

(57) ABSTRACT

A voice networking switching (VNS) appliance and methods for its use are disclosed. In a preferred embodiment, the VNS is an adjunct processor attached to a WAN node and software-configured to provide switching services for private network PBXs and PSTN central offices that have trunks ported to a WAN node. The switching services offered by the VNS allows PBXs to establish voice and data connections between each other, as well as with the PSTN, dynamically via Switched Virtual Circuits (SVCs) that are routed directly across a WAN. This arrangement eliminates the need for an extensive mesh of PVCs or leased "tie lines" carrying voice and data traffic between ported trunks across the WAN. Furthermore, private network end users can connect to the PSTN without their PBX having a direct connection to the PSTN. Likewise, a private network connection to a PSTN central office can be established in a location where no PBX is present.

One desirable feature of the VNS as disclosed is breakout point selection. This feature allows a private network to have several, potentially geographically-dispersed connections to the PSTN. The VNS decides, for each private network-to-PSTN call, the optimal breakout point (from amongst the private network PSTN connection points) for the call, based on criteria such as toll charges for each breakout point, switch and port loading at each breakout point, etc. This allows calls to be dynamically routed to the PSTN so as to reduce toll charges and balance network loading.

29 Claims, 8 Drawing Sheets

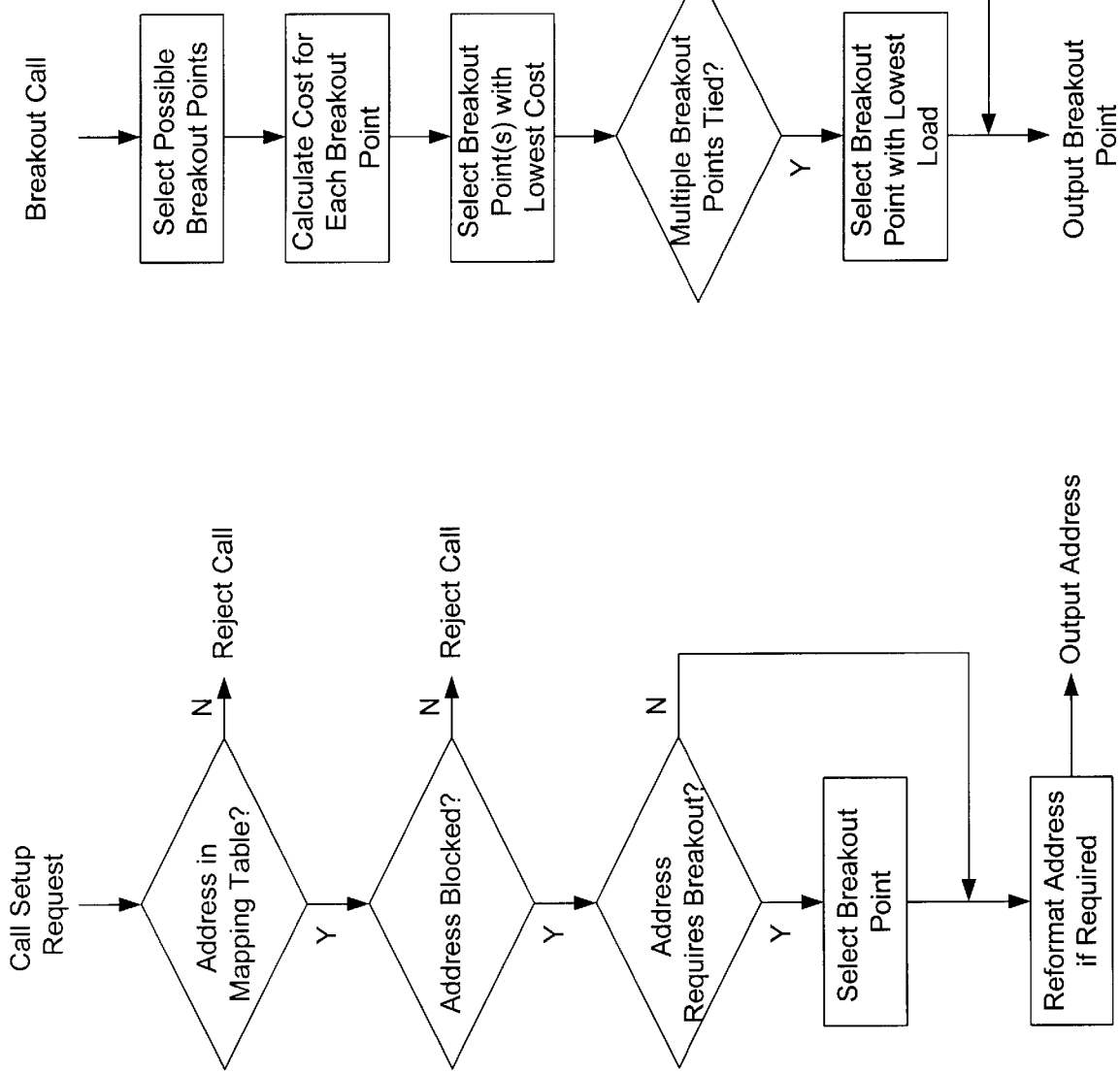

BREAKOUT/BREAK-IN HYBRID NETWORK SYSTEM

This application claims the benefit of provisional application Ser. No. 60/144,417 filed Jul. 16, 1999.

FIELD OF THE INVENTION

This invention pertains generally to the use of wide-area data networks to carry switched-circuit calls, and more particularly to an adjunct voice network system for routing calls across a wide area data network to connect a private voice network with a public switched telephone network.

BACKGROUND OF THE INVENTION

A Private Branch Exchange (PBX) is an automatic telephone switching system that enables users within an organization to place calls to each other without going through the public switched telephone network (PSTN). Many large organizations require the deployment of numerous PBXs to form a private network that covers the organization.

Although an organization could connect each of its PBXs to the PSTN, and then rely on the PSTN in order to interconnect their PBXs, this approach is not always preferred. Leased tie lines between sites are generally expensive. Since many organizations maintain a Wide Area Network (WAN) for data communications between their various buildings and sites, it would be preferable if PBX-to-PBX communications could be routed across the WAN.

FIG. 1 shows an example of one configuration for connecting PBXs across a WAN. Four PBXs A, B, C, and D connect to WAN 16. Each PBX connects directly to one of switches 18, 19, 20, and 21, typically through one or more E1 or T1 trunks. Switches 18, 19, 20, and 21 communicate with each other using Frame Relay packets, ATM (Asynchronous Transfer Mode) cells, or another common WAN packet technology.

In order for the PBXs to communicate across WAN 16, a mesh of Permanent Virtual Circuits (PVCs) is set up between them. For instance PVC 22 connects PBXs A and B via a dedicated connection; likewise, PVC 24 connects PBXs C and D, PVC 26 connects PBXs A and C, and PVC 28 connects PBXs A and D. Although a Virtual Circuit only allocates a physical circuit when there is data to send, a PVC is similar to a dedicated private line because the connection is set up on a permanent basis.

A tradeoff exists between the number of PVCs that are set up between PBXs and the percentage of WAN bandwidth consumed. Although it may be practical to fully mesh the four PBXs of FIG. 1, with larger PBX networks partial meshing makes more sense in order to conserve bandwidth. Thus the PBXs of FIG. 1 are demonstrated as partially meshed. Although a caller on PBX A may directly contact a party attached to any of the PBXs, a caller on PBX B has no PVC directly available to a party attached to PBX C or PBX D.

With no direct PVC, it may still be possible for the caller to indirectly contact PBX C or D, by going through PBX A and using two tandem PVCs. But the use of tandem PBXs wastes PBX and WAN resources, and requires additional sophistication in the PBXs. It also generally precludes the use of a voice compression codec, or at least limits compression to one of the PVCs, as tandem encodings dramatically degrade sound quality.

With the system of FIG. 1, each PBX uses a separate trunk to connect to a central office in PSTN 40. Thus, when a user connected to PBX A desires to call a party reachable through PSTN 40, PBX A accesses a line to central office 30 to complete the call. Although in FIG. 1 each PBX is shown connected directly to a central office, in practice some PBXs may use a local tandem PBX to handle calls to the PSTN.

SUMMARY OF THE INVENTION

The networking approach shown in FIG. 1 has many disadvantages. As the private network size increases, scaling this model becomes increasingly complex, expensive, and wasteful. Each PBX must also provide a local trunk (or local tandem PBX route) to the PSTN if users of that PBX are to reach the outside world. Conversely, a PBX is required at any point where a connection to a PSTN central office is desired.

The embodiments described herein address these problems by adding one or more voice network appliances to an existing packet/cell based wide-area data network. Central office trunks and PBX trunks are tied to ports on WAN nodes, but PVCs are not established for the trunk bearer channels. The voice network appliances exchange signaling with PBXs and central offices tied to the wide-area data network, and dynamically establish voice and data connections directly between the PBXs and central offices as needed. Thus, to a PBX or a central office, the voice network appliance appears to be just another PBX. And yet, preferably, only signaling circuits are routed through the voice network appliance. The voice network appliance dynamically creates switched virtual circuits directly between the PBX and central office tie points to provide bearer channels for calls.

Each of the disclosed embodiments provide some or all of the following advantages. PBXs need not have local connections to the PSTN, and conversely, the PSTN may be tied to the wide-area network and interfaced with the private network without an intermediate PBX. This reduces hardware and trunk requirements significantly. A single port and signaling channel can serve many destinations, both private and public. Wide-area data network resources are conserved, since backbone trunk groups are eliminated. Since tandem PBXs are avoided, all calls can be compressed for transmission across the WAN. The system becomes highly scalable, since the only permanent circuits are the signaling circuits, which scale almost linearly as new ports are added. In embodiments with connections to several geographically diverse central offices, the voice network processor can also select an appropriate "breakout" point from the WAN to the PSTN—one that eliminates or reduces toll charges. And conversely, PSTN calling parties can reach anyone anywhere on the private network by calling a nearby central office number and "breaking in" to the private network through the voice network appliance. Also, PBX signaling software and central office signaling require no modification for interaction according to the preferred embodiment.

In one aspect, the present invention discloses a voice network appliance. The appliance has a data connection point for connecting the appliance to a wide-area data network. It also has a signaling unit that exchanges call signaling information with one or more PBXs and one or more PSTN central offices, each having a trunk connected to the wide-area data network at a corresponding network node known to the appliance, and each connected to the appliance through a permanent virtual circuit. The appliance has a switched circuit manager to establish and manage switched virtual circuits between the nodes for the purpose of providing bearer channels for calls between the exchange and/or central office trunks connected to those nodes. A call controller controls call progression by coordinating the functions of the signaling unit and the switched circuit manager. Finally, an address translation unit receives called party addresses for call requests received by the signaling unit, determines a destination exchange and/or central office for the call requests, translates the called party addresses into formats understandable by the destination equipment, and supplies the translated addresses and destinations to the call controller.

In a further aspect of the invention, a method of operating a voice network appliance is disclosed. The method comprises connecting the voice network appliance to a node in a wide-area network, and establishing, for each of two or more wide-area network termination points, a signaling exchange wide-area network circuit between the voice network appliance and that termination point. Each termination point may terminate either a PBX trunk or PSTN trunk to a node in the wide-area network. An address translator within the appliance is provisioned to recognize, for call requests originating at each termination point, the called termination point for the called party indicated in the call request. When a call request is received from an originating termination point over its associated signaling exchange circuit, the appropriate called termination point for the called party indicated in the call request is determined, and the call request is signaled to the called termination point over its associated signaling exchange circuit. A bearer channel for the call is provided by establishing a switched virtual circuit between the originating and called termination points.

BRIEF DESCRIPTION OF THE DRAWING

The invention may be best understood by reading the disclosure with reference to the drawing, wherein:

FIG. 7 shows, in flow chart form, address processing for a call request incoming to the VNS, according to one embodiment of the invention;

FIG. 8 shows, in flow chart form, breakout point selection for a call request, according to one embodiment of the invention.

DETAILED DESCRIPTION OF THE PREFERRED EMBODIMENTS

The embodiments described below are referred to with the term Voice Network Switching (VNS) because they allow circuit-switched bearer channels to be switched within a data network. The channels need not carry voice data, however, but may also carry fax data, modem traffic, or digital data.

Voice Network Switching is typically implemented with two or more VNS servers deployed in a WAN switching network. The VNS server, referred to herein simply as a VNS or a VNS appliance, is a standalone or rack-mounted adjunct processor co-located with a wide-area switch. For example, a UNIX workstation with appropriate network cards can serve as a VNS appliance. VNS servers are preferably deployed in redundant pairs.

Figure 1:
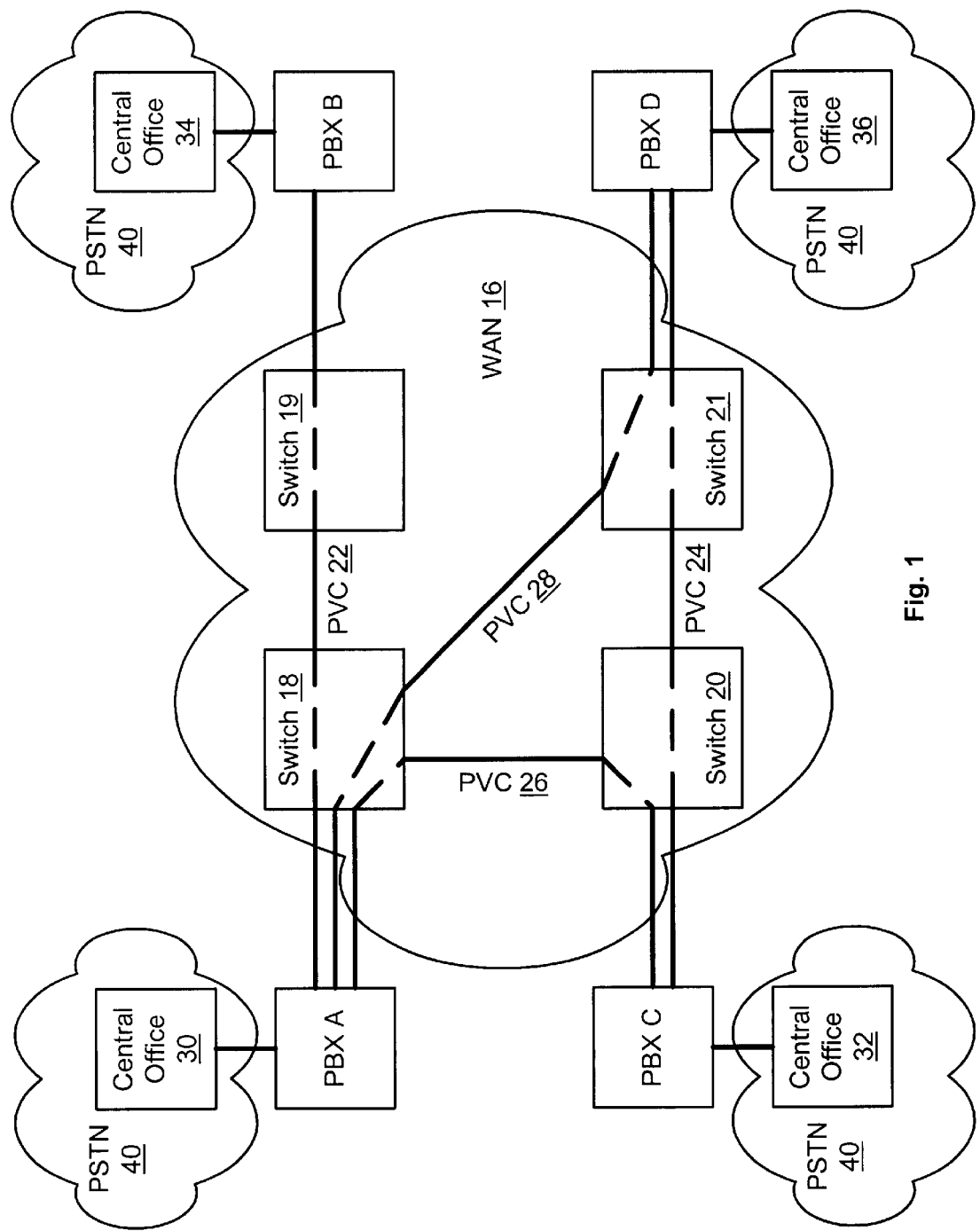
FIG. 1 illustrates a prior art approach to connecting PBXs through a WAN and to the PSTN.
Figure 2:
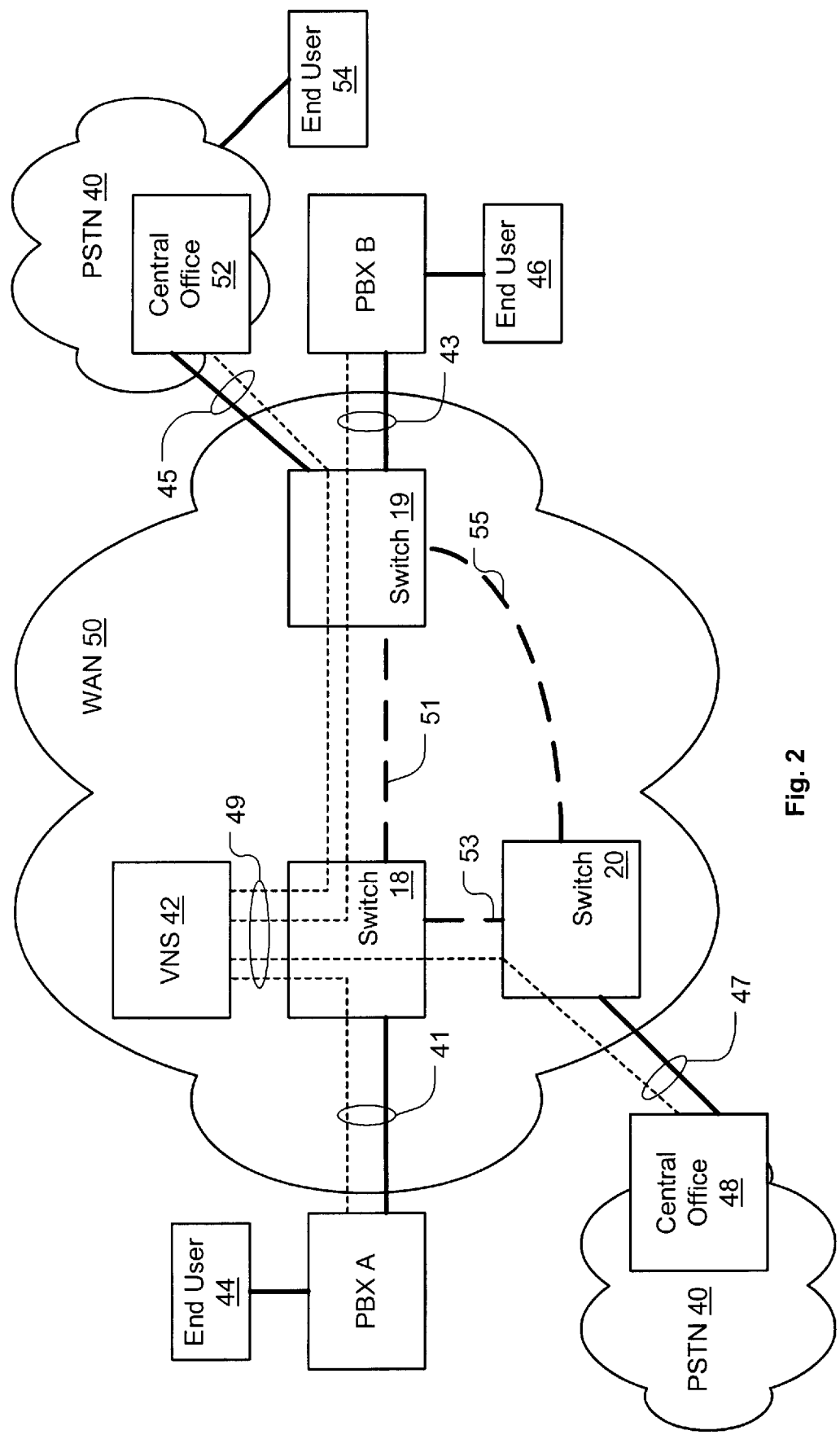
FIG. 2 illustrates connection of PBXs and PSTN central offices through a WAN using an embodiment of the invention.

FIG. 2 shows a basic VNS system configuration. VNS 42 physically connects to switch 18 within WAN 50. PBX A physically connects a trunk 41 (e.g., a T1 or E1 TDM trunk) to a port on switch 18, PBX B connects a trunk 43 to a port on switch 19, central office 52 connects a trunk 45 to a separate port on switch 19, and central office 48 connects a trunk 47 to a port on switch 20. In this example, each trunk is an E1 trunk with one TDM signaling channel, although other types of circuit-switched connections would work equally with the disclosed embodiments.

VNS 42 establishes signaling exchange circuits 49 with PBXs A and B and central offices 48 and 52. Each signaling exchange circuit typically comprises a permanent virtual circuit that connects the signaling channel of a trunk to a VNS-connected port and channel on switch 18. The PBXs and central offices need not, and generally will not, know that their signaling channels are being routed to VNS 42.

Voice and data traffic pass over WAN 50 on SVCs 51, 53, and 55, which are created and destroyed by VNS 42 as required to establish and close calls according to signaling from the PBXs and central offices. Again, it will appear to the PBXs and central offices that their calls are being switched through a compatible device that is handling signaling and bearer channels. In reality, voice and data traffic are never routed through VNS 42. Instead, VNS 42 receives only signaling, and signals switches 18, 19, and 20 separately to set up and tear down SVCs between specific ports and channels on the switches. An SVC links the originating port and bearer channel with the called port and bearer channel, thus completing an end-to-end bearer circuit for a requested call.

In a first basic illustration, a typical private network call setup follows this sequence: First, end user 44 places a call to end user 46 by dialing an appropriate private network address. PBX A then initiates a call setup message, e.g., using a common signaling protocol such as DPNSS, QSIG, Q931A, or AT&T 4ESS ISDN format; the message will indicate, among other things, the called party address and the calling party address. This message is passed across the signaling channel of trunk 41 through switch 18 to VNS 42. Next, VNS 42 processes this message, including determining whether this will be a data or a voice call, and determining that the called party address can be reached through PBX B. VNS 42 sends a call setup message to PBX B over the PVC that connects to the signaling channel of trunk 43. VNS 42 will continue to repackage and relay signaling information between PBX A and PBX B as the call progresses. At some point before or after end user 46 answers the call, PBX A and PBX B will each inform VNS 42 of the channel on their respective trunks that will be used for the call. Once the channels are known (the VNS already knows the switches and ports for trunks 41 and 43), VNS 42 instructs switch 19 (or switch 18) to build a circuit 51 between the appropriate ports and channels on switches 18 and 19. This may include specifying a voice codec to be used on circuit 51, if the call is a voice call. When the circuit is built, switch 19 passes a message to VNS 42, which may then send a connect message to PBX A, and the connection setup is completed.

A typical call disconnect would follow this sequence: When either party hangs up, a release message is sent from the associated PBX through the trunk signaling channel to VNS 42. Circuit 51 is removed by the VNS that created it, and a call release message is sent from VNS 42 through the signaling channel to the other PBX. After the end user acknowledges the release message, the call is cleared. The originating VNS also generates a Call Detail Record (CDR), which includes the calling and called party numbers, call setup time and call duration. CDRs are kept on the VNS in files that can be periodically collected by another host, such as a network management system. Each VNS also keeps other statistics for maintenance and diagnostic purposes.

In a second basic illustration, end user 44 places a call to end user 54, an end user connected to PSTN 40. In a typical private network, outside calls will require that some digits be prepended and/or postpended to the actual telephone number of end user 54. PBX A need only recognize that the call is not to another user in that PBX exchange, and passes the address in a call request to VNS 42. VNS 42 may reformat the address to conform to the PSTN dial plan by stripping and/or adding digits. It may also screen the route, i.e., some end users 44 may be restricted from placing calls to the PSTN (or toll calls to the PSTN), or an appropriate access code may be required. Finally, call setup signaling may have to be converted by VNS 42 to a protocol that is understood by central office 52, e.g., ETSI ISDN. Generally following the steps outlined for the first illustration, the call may then be completed to end user 54, without PBX A having a trunked connection to the PSTN, or any capability for exchanging signaling with the PSTN.

An optional feature of VNS 42 is breakout point selection. Note that in FIG. 2, central office 48 and central office 52 both connect to PSTN 40. Thus either office may be used to complete the call to end user 54. But, if central office 52 is local to end user 54, and central office 48 requires a toll call to reach end user 54, it will usually be advantageous for the VNS to connect to end user 54 through central office 52. As will be discussed in further detail below, breakout point selection uses a predefined decision criteria to determine which of several breakout points should be used for any particular call. Digit stripping and/or prepending may also be affected by the choice of central office. Note also that a choice may be between two connections to the same central office, with each using a different long-distance carrier.

In a third basic illustration, end user 54 can break-in to the private network to potentially reach either end user 44 or end user 46. This requires that a PSTN number be set up to access a line on trunk 45 (or trunk 47). VNS 42, when it receives a call setup request from a central office, will perform address translation, necessary protocol translation, and determine the private network destination for the call. This feature can also save toll charges, since end user 54 can potentially reach the entire private network by dialing a local number.

Figure 3:
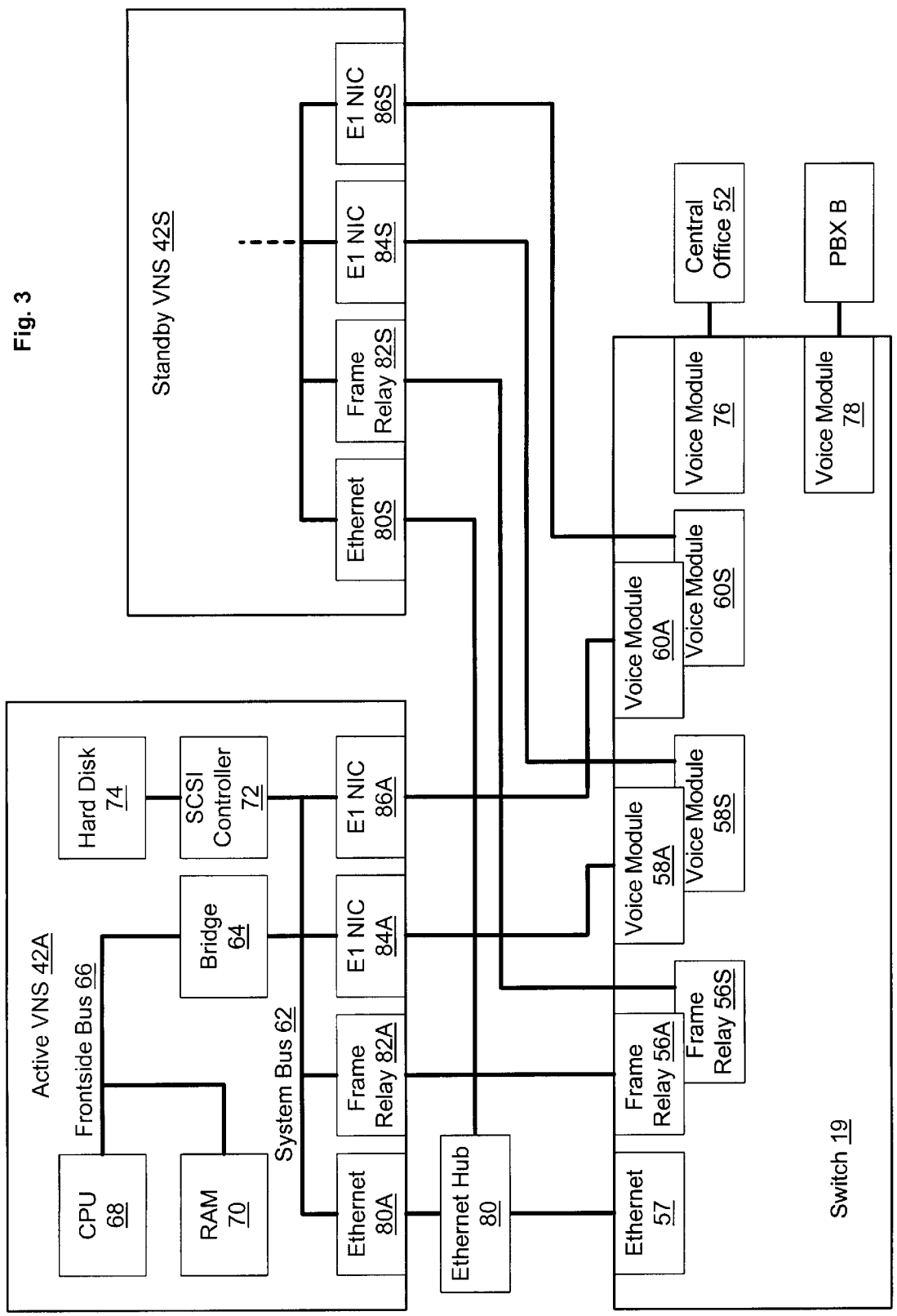
FIG. 3 illustrates one VNS server configuration and a VNS system configuration for an embodiment of the invention.

FIG. 3 shows a block diagram of one preferred VNS system configuration. A VNS system consists of two identical VNS servers 42A and 42S, which can be configured to perform as a redundant pair comprising an active VNS and a standby VNS. Each VNS server is a closed, scalable multitasking platform such as a UNIX workstation. As such, a typical server has a CPU 68 and random access memory 70 connected by a frontside bus 66. A bridge 64 connects frontside bus 66 to a system bus 62. System bus 62 supports multiple communication cards, as well as a SCSI controller 72 connected to disk drive 74.

The VNS system is typically connected to a co-located wide-area switch 19 and is often mounted in the same rack. Each VNS in the pair is connected to the wide-area switch through a Frame Relay card (82A and 82S), a pair of E1 channelized Network Interface Cards (E1 NICs 84A, 86A and 84S, 86S), and an Ethernet (that is, IEEE 802.3) interface (80A and 80S). The Frame Relay connection is used for communication between VNS systems attached to the same WAN but having different service areas. The E1 NICs are used to pass signaling information between the VNS and the PBX and central office trunks it services. The Ethernet interface is used for various communications between the VNS and its twin, the VNS and the switches in its service area, the VNS and a network management system, and the VNS with network-connected terminals via telnet.

Within switch 19, voice modules 58A, 58S, 60A, 60S, 76, and 78 each provide a line interface for an E1 or T1 line connection (these connections may go through a single access concentrator). The voice modules convert between TDM data streams and packet-based data, and may also provide other services. In particular, voice modules 76 and 78 may provide compression and decompression services for voice bearer channels, as well as silence detection.

Each E1 Network Interface Card (NIC) in a VNS server can interface with 30 signaling channels. The second E1 NIC card in the VNS provides redundancy. Thus although there are two E1 NICs installed in every VNS, they both do not have to be connected to switching node 19. And although FIG. 3 shows the active and the standby VNSs connected to different switching node Frame Relay cards 56A and 56S, they do not have to be. They could be connected to different physical ports on the same card. The VNSs are typically connected to one another and to the node through a 10BaseT Ethernet hub 80.

The preferred redundancy feature provides VNS-based redundancy that is not based on normal voice module-based redundancy. With normal voice module-based redundancy, each E1 NIC card in a VNS has to be connected through a Y-cable to two voice module cards in the node. So theoretically to provide redundancy for all the node's voice module cards attached to the VNS, a redundant pair of VNSs with 4 E1 NIC cards would require 8 voice module ports.

The VNS voice module redundancy feature eliminates the need for redundant voice module ports attached to each E1 NIC card. This feature, which can be enabled or disabled using the VNS Command Line Interface, processes voice module card failure SNMP Traps from the node. When a voice module fails, the VNS receives a Trap. The VNS determines if the failed voice module is attached to a VNS E1 NIC. If the failed voice module is attached to the VNS, and the standby VNS is up and not in a failed state, the VNS will trigger a switchover to the redundant standby VNS.

The VNSs will change roles, i.e., switchover, when the active VNS is no longer in normal operation or when the network operator changes their modes through a command line interface. The former case will be detected by the standby VNS missing Keep Alive messages from the active VNS; the latter case is indicated by an operator-issued SNMP SET command that changes the VNS role in the MIB (Management Information Base). When a switchover occurs, existing SVC calls created by the active VNS will be cleared, and PBX-to-VNS signaling PVCs will be switched over to the newly active unit, which will assume the same provisioning and configuration as was maintained by the previous active VNS.

Figure 4:
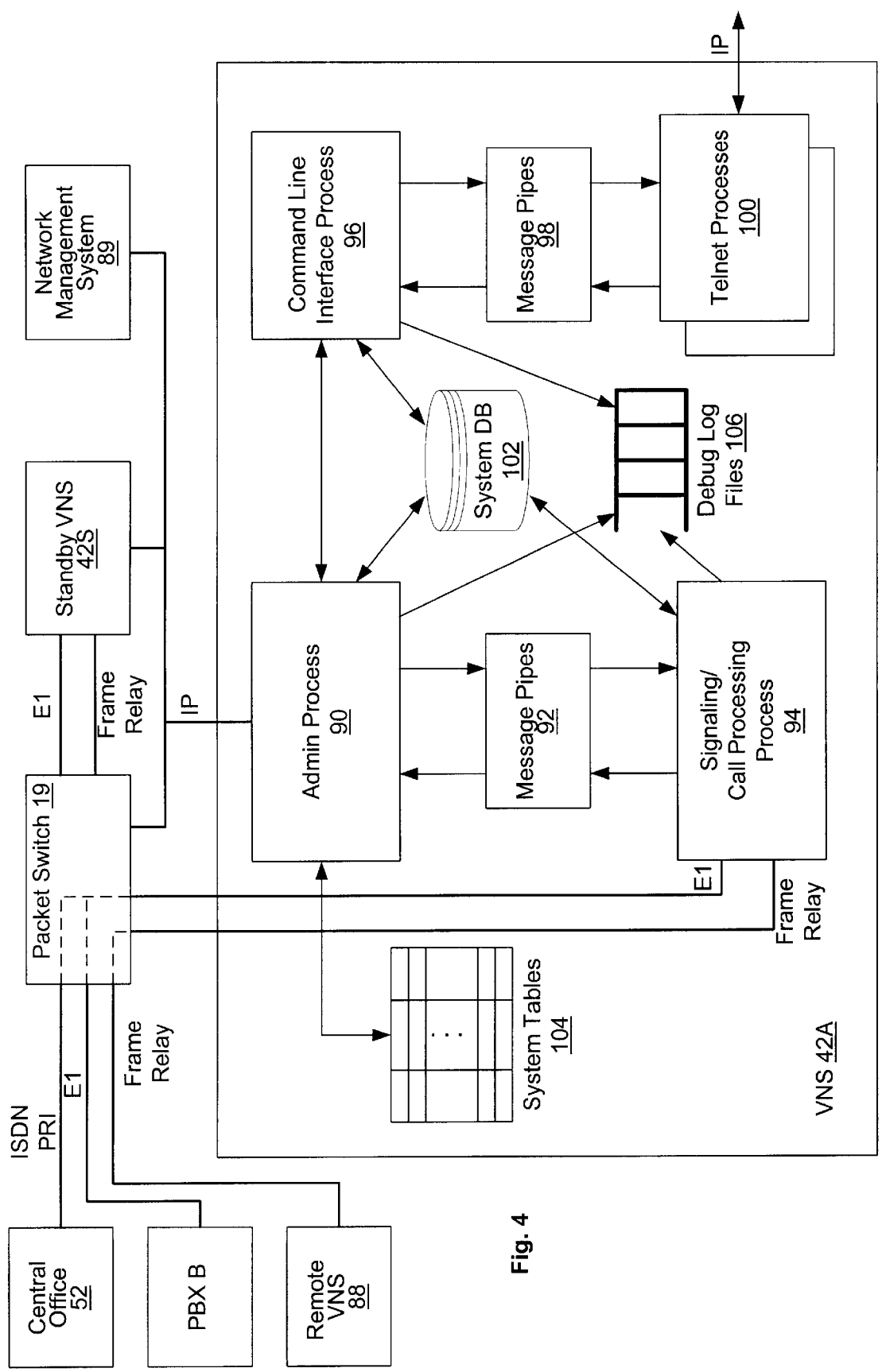
FIG. 4 shows processes that execute on a VNS server according to one embodiment of the invention, including their internal and external communication paths.

FIG. 4 illustrates the main processes that run on VNS 42A, including their primary internal and external connections. Typically, these processes are implemented in software, stored on hard drive 74 (FIG. 3) of the VNS server (or on some other computer-readable media), and are resident in VNS memory 70 (FIG. 3) during operation of the VNS server.

The two main VNS processes are admin process 90 and signaling/call processing process 94. Admin process 90 handles virtual circuit building and tear-down, data network status detection and monitoring, communications with the standby VNS, and provides a network management system interface. Signaling/call processing process 94 handles PBX signaling, PSTN signaling, signaling exchange with remote VNS 88 (if VNS 88 exists), call control, address translation, address validation, and route screening. A set of message pipes 92 allow admin process 90 and signaling/call processing process 94 to coordinate their operations.

Several secondary processes can also run in conjunction with the VNS. The VNS Command Line Interface (CLI) process 96 is run from the VNS multitasking platform, either from a directly connected terminal or remotely through a telnet session (telnet users can perform these functions by accessing command line interface process 96 via message pipes 98 and telnet processes 100). The VNS CLI provides a mechanism for an operator to configure the VNS and provision VNS services. Using an SNMP interface to VNS, the CLI can configure the VNS database, provision (or delete) addresses in the database, and get the VNS operational status.

System tables 104 are typically stored in RAM, and contain configuration and status information for switching nodes, cards installed in the switching nodes, ports on those cards, mapping from ports to PBXs and central office trunks, voice/fax bearer capabilities, and debug levels available. Admin process 90 uses this information to monitor equipment status, route calls, and manage switched virtual circuits.

Figure 5:
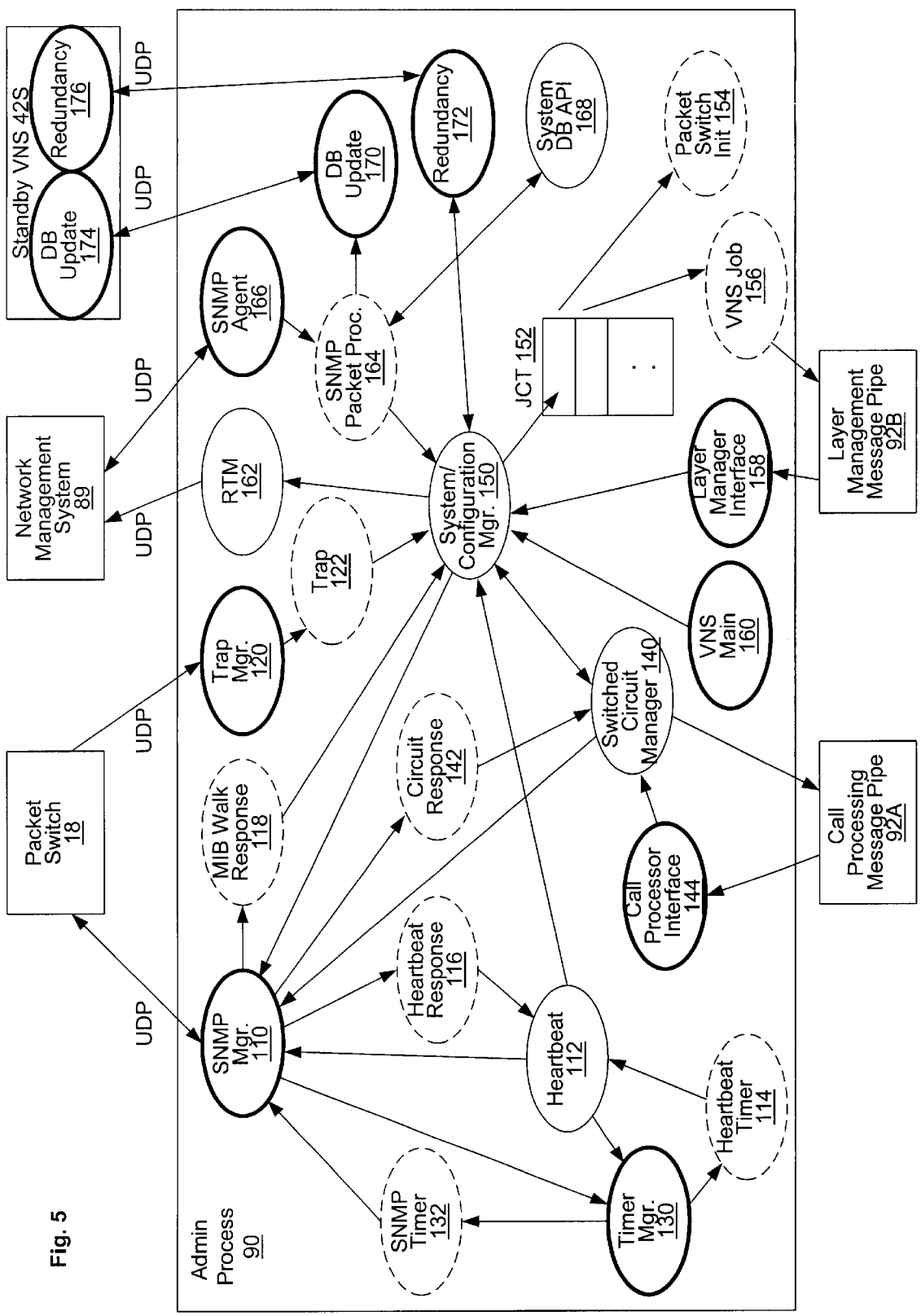
FIG. 5 depicts, for an administrative process, various threads of the process and their interactions.

FIG. 5 shows the implemented process threads for admin process 90. VNS main 160 represents the initial process thread. VNS main 160 kicks off system/configuration manager thread 150. The other threads shown in bold outline are also started during initialization, while those shown in dashed outline are transient in nature and may have multiple instances running concurrently. The operation of each thread will be explained briefly below.

SNMP (Simple Network Management Protocol) manager thread 110 communicates with SNMP agents located on the switches serving PBXs in the VNS service area. This thread is responsible for communications between WAN network elements and a variety of threads in admin process 90. It operates in conjunction with timer manager 130, which creates an SNMP timer thread 132 for timed SNMP requests such as status requests and circuit build requests. Timers are used to detect unresponsive network elements.

Also related to timer manager 130 is heartbeat thread 112 and heartbeat timer 114. Heartbeat thread 112 periodically issues status requests to various hardware elements in the systems tables, allowing the VNS to determine whether they are still on line. Heartbeat response 116 returns status from the hardware; this information may then be passed to system/configuration manager 150 if the detected status requires action.

The SNMP manager also sends responses to an initial hardware status query to the MIB (Management Information Base) walk response thread 118. These responses are used to initialize the system tables (not shown for clarity).

Switched circuit manager 140 handles building and tearing down switched virtual circuits. Generally, a request for a circuit will be routed through call processing message pipe 92A and call processor interface 144 to switched circuit manager 140. Switched circuit manager 140 signals SNMP manager 110 to request an SVC from a switch; circuit response thread 142 receives a return indication from the switch for the action (e.g., set up successful, set up failed, etc.). Switched circuit manager 140 relays circuit setup messaging back to the signaling/call processing process through call processing message pipe 92A.

One of the jobs of system/configuration manager 150 is to communicate with the layer manager of the signaling/call processing process regarding, e.g., E1 channel allocation. Layer manager interface 158 handles the receipt of information from the layer manager (through layer management message pipe 92B), and passes this information to system/configuration manager 150. Manager 150 keeps Job Control Table (JCT) 152. Information in this table is passed back to the layer manager through message pipe 92B, and is also used by packet switch unit 154 to create signaling PVCs between the VNS and the PBXs and central office trunks that it serves.

Another thread maintained by process 90 is trap manager 120. Trap manager 120 receives indications from packet switch 18 of hardware problems. When such an indication is received, a trap thread 122 is created for the purpose of relaying this information to system/configuration manager 150. Likewise, RTM (Robust Trap Mechanism) 162 can be used by system/configuration manager 150 to report VNS problems to network management system 89.

Network management system 89 also has an SNMP manager (not shown) that communicates with SNMP agent 166. This communication path allows a network operator to gather information from the VNS and/or modify system parameters or the system database (through system database API 168).

Finally, two threads are used to communicate with standby VNS 42S. The database update thread 170 performs a database dump to the standby VNS when it comes up. Redundancy thread 172 is used to resolve redundancy roles and for sanity checking between the two VNS servers.

Various threads can write to the system tables 104 (see FIG. 4, not shown in FIG. 5 for clarity). These threads include packet switch unit 154, switched circuit manager 140, SNMP manager 110, and system/configuration manager 150.

Figure 6:
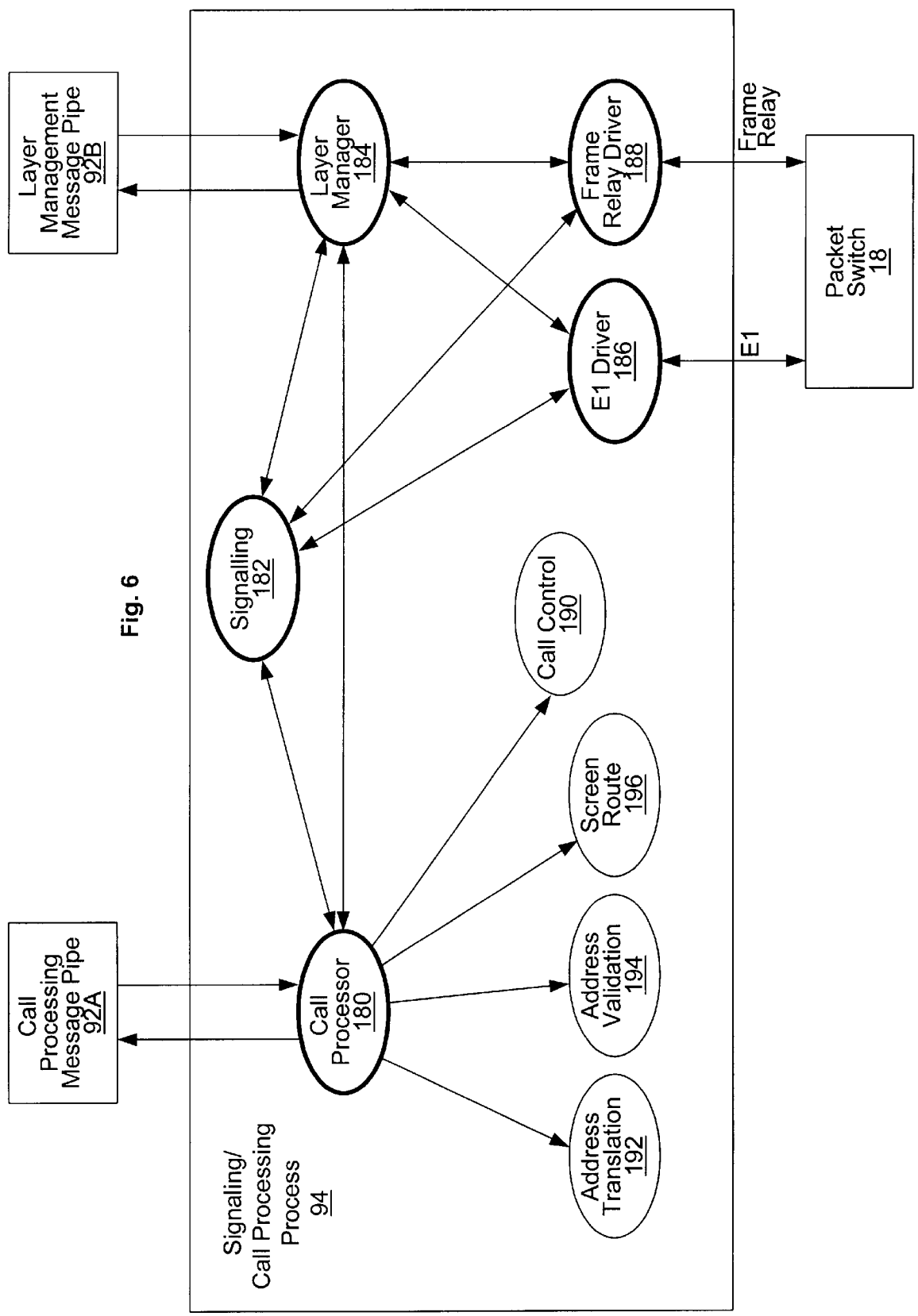
FIG. 6 depicts, for a signaling/call processing process, various threads of the process and their interactions.

Turning now to FIG. 6, the threads of signaling/call processing process 94 are depicted. Two threads (call processor thread 180 and layer manager thread 184) communicate with the admin process through message pipes 92A and 92B. Call processor thread 180 provides call routing and control services. Layer manager thread 184 provides administrative functions to manage components of process 94, such that signaling exchanges occur appropriately. Layer manager 184 also interfaces with admin process 90 to receive call translation numbers and store these in tables for process 94, and to notify admin process 90 of events, e.g., a link going down or coming up.

Layer manager thread 184 and signaling thread 182 each communicate with E1 driver thread 186 and frame relay driver thread 188, which in turn communicate signaling information to and from their respective NICs. Since the frame relay connection is only used for communication with remote VNS systems, if the network contains a single VNS system, then frame relay driver thread 188 is not needed. It is also recognized that instead of using a frame relay connection, the VNS could communicate with a remote VNS system via the E1 interface, although this uses a channel that could otherwise be used for communication with a PBX or central office trunk.

Signaling thread 182 interprets signaling received from PBXs, central offices, and remote VNS systems. Preferably, this thread can comprehend multiple signaling protocols. For example, in one embodiment the signaling between the VNS and the PBXs and central offices can be based on one of six ISDN (Integrated Services Digital Network) signaling variants. These include:

(1) AT&T 4ESS ISDN protocol variant in accordance with Technical Reference 41459—AT&T Network ISDN Primary Rate Interface and Special Application, User-Network Interface Description (AT&T, August 1996). This includes support for various options, including symmetrical slave without channel negotiation, Basic Call with detection of Bearer Capability information for voice and data, pass calling and connection line ID, and calling and connected line ID restriction.

(2) Digital Private Network Signaling System (DPNSS) in accordance with BTNR (British Telecommunications Network Requirement) No. 188, Issue 5, Vols. 1–5, December 1989.

(3) QSIG based on ETSI QSIG standards.

(4) European ISDN (ETSI).

(5) Q931A, also known as Japanese ISDN, based on JT-Q.931-a (layer 3), JT-Q.921-a (layer 2), and JT-i.431-C (layer 1 . . . JT) specifications as described by TTC.

(6) CAS 2.2, a VNS QSIG protocol designed to work with a switch's Voice Module to provide Voice Network Switching for PBXs using CAS signaling.

Voice Network Switching was designed to work with five forms of message-oriented common-channel signaling often used by PBXs—DPNSS, QSIG, ETSI, Q931A (Japanese ISDN), and AT&T 4ESS ISDN. Several of these signaling protocols are also commonly used in PSTN central office trunk signaling. These messages set up, maintain, and terminate voice channel connections. They also support the operation of many PBX supplementary services or features, including calling name and number display, network call forward, network call redirect, centralized attendant, centralized voicemail, etc. These signaling protocols support a set of capabilities that are very desirable in an enterprise voice network. The wide-area switches function as transit nodes for these networks, receiving call control and feature messages from PBXs and central office trunks via their signaling-channel connection and forwarding these messages across the VNS signaling overlay network to the appropriate destination PBX or central office trunk.

DPNSS, QSIG, and Q931A are variants of ISDN D-channel signaling. QSIG is based on ISDN Q.921/931 standards. DPNSS is a pre-ISDN standard protocol, developed by British Telecommunication (BT) in the 1980s. QSIG was originally specified by ECMA, then was adopted by European Telecommunications Standards Institute (ETSI) and the ISO. It is becoming a world-wide standard for PBX interconnection. ETSI is also used as the name for European ISDN. Q931A is based on Japanese ISDN standards. All of these protocols (DPNSS, QSIG, ETSI, and Q931A) are supported by a different signaling stack in the VNS. Thus in VNS, a signaling stack refers to the particular signaling protocol to be supported by the VNS for a given PBX or central office trunk.

Call processor thread 180 relies on address translation thread 192, address validation thread 194, and screen route thread 196 to provide its routing services. Call control thread 190 manages call states for active calls.

Address translation 192, address validation 194, and screen route 196 rely on an address mapping table (which may be part of system tables 104) to perform their functions. The address mapping table stores, in part, a VNS "dial plan" that contains the prefixes that are understood by the VNS. For each prefix in the address mapping table, the prefix may be "blocked" if the call setup request came from certain origination points—these blocking relationships are also stored in the address mapping table data. The mapping table can further contain translation rules for mapping an incoming address to an outgoing address that can be understood by the destination PBX or central office. Finally, the address mapping table can contain information needed for breakout point selection, such as approximate toll rates for various breakout points, keyed to time of day, and node or trunk loading data.

In a typical sequence such as shown in FIG. 7, when a call setup request is received, call processor 180 consults address validation thread 194. Address validation thread 194 checks the called address prefix in the address mapping table to see if the prefix is one that is understood by the VNS. If it is not, call processor 180 can notify signaling 182 that it has received an invalid address. But if the address is valid, screen route 196 then will compare the prefix of the address to a list of any blocked prefixes for the origination point of the request. If the address is blocked, call processor 180 can notify signaling 182 that the desired address is unreachable. If the address is not blocked, address translation 192 is activated.

Address translation 192 determines what formatting needs to be done on the address so that the destination PBX or central office trunk will understand the address. For instance, if the originating PBX required an "11" prefix to designate a particular destination PBX, and the destination PBX expected no prefix, the "11" would be stripped by address translation 192 before the address was supplied to the destination PBX. Similarly, if an originating PBX required 9+1+(area code)+(number) for a breakout call, address translation 192 will strip the 9 for a long distance call. Also, when a breakout point local to the called number is available, address translation 192 can strip the 1+(area code) also before sending the address to the breakout point.

When multiple breakout points are known to the VNS system, address translation 192 can also be provisioned to perform breakout point selection. The address mapping table can be supplemented with rules for selecting an "optimal" breakout point for each breakout call. For instance, the address mapping table can indicate what area code or codes, and what prefixes within those area codes, can be connected through a particular breakout point without a toll charge. It can also indicate, for toll prefixes and toll area codes, the approximate toll charge if connected through that central office (this could also be configured to reflect differing toll charges depending on time of day, weekday/weekend rate schedules, etc.).

As shown in FIG. 8, when provisioned with this "toll map", the breakout point selection can first look for a breakout point (or points) that results in a free call. If no such point is available, the breakout point selection compares toll rates for each breakout point, and selects the breakout point providing the best rate. In the case of a tie, other criteria can be used to aid in selection. For example, if one breakout port is on a switch that is heavily loaded, and another is on a switch that is lightly loaded, the lightly loaded switch can be selected. Or, if one breakout port has a high channel utilization and the other breakout port has a lower channel utilization, the latter can be selected. These load balancing considerations can even result in the selection of a breakout point with a higher toll cost, if load vs. cost is provisioned as a quantifiable tradeoff in the breakout point selector.

The basic VNS system described above can handle signaling for 30 trunks. If the private network is large, the VNS system can be scaled by adding additional VNS appliances. With a multiple VNS system, each VNS (or redundant pair of VNSs) are assigned to control a group of one or more switching nodes, including the PBX or central office trunks terminated at those nodes. These nodes are considered the VNS's service area (or domain). The VNS will typically be directly attached to one of the switching nodes in its area. The VNS processes call setup or release requests for calls originating in its area, or calls received from another area but destined for its area. VNS areas do not overlap.

The VNS exchanges heartbeat messages with all of the switches in its area. The heartbeat allows the VNS to maintain a status of each node in its area that has a port controlled by the VNS. Thus each VNS is responsible, in its service area, for detecting if a node goes out of service or returns to service.

Figure 9:
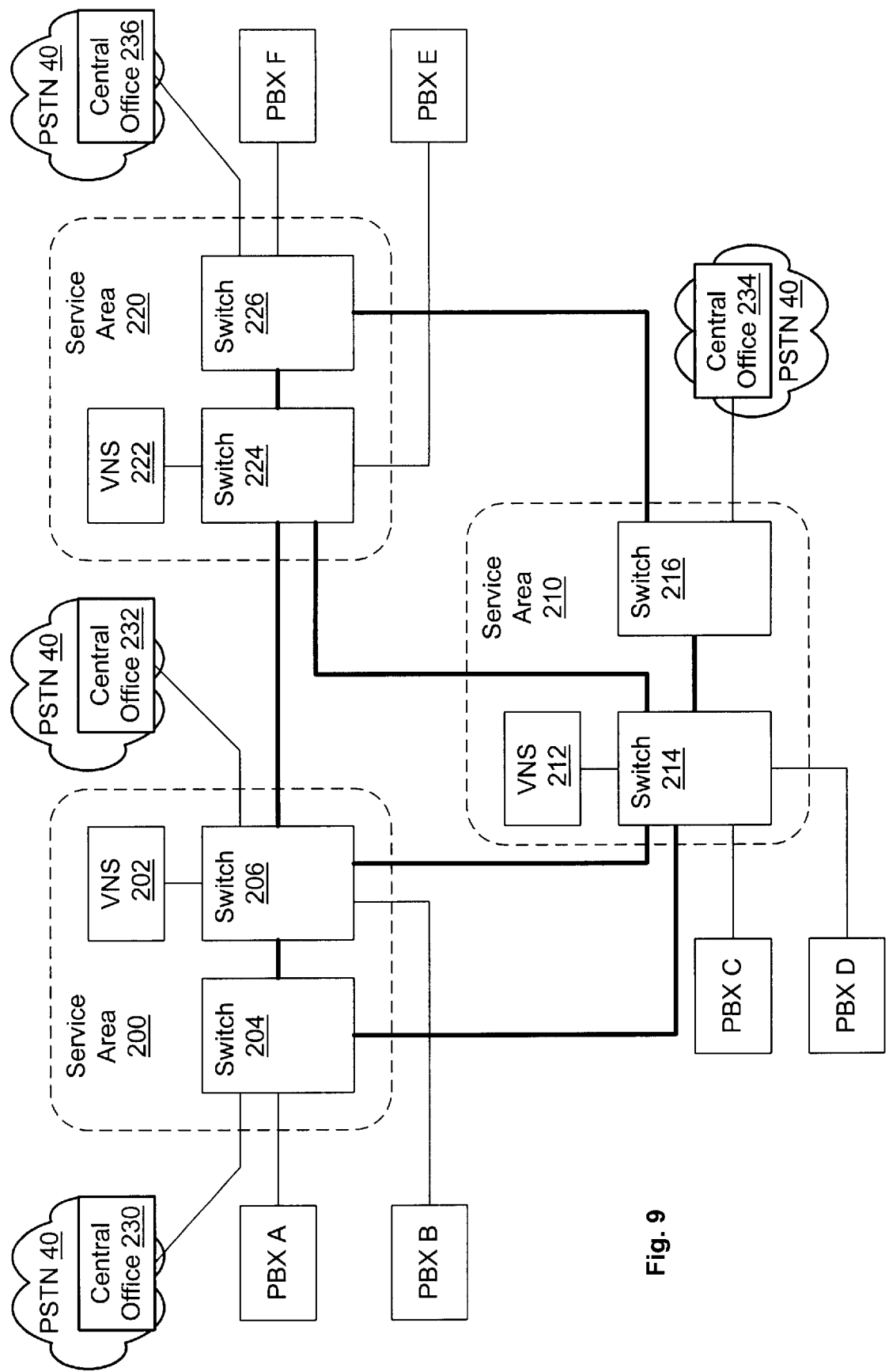
FIG. 9 shows a multiple service area VNS network.

FIG. 9 illustrates a network with three VNS service areas 200, 210, and 220. Although it is not shown in the figure, the VNSs in each area will be installed as a redundant pair in each area. There is one VNS system (one redundant pair of VNSs) serving each individual service area (or domain).

In FIG. 9, each VNS has two switches in its area. VNS 202 has switches 204 and 206, VNS 212 has switches 214 and 216, and VNS 222 has switches 224 and 226. Considering service area 200, for example, VNS 202 exchanges heartbeat messages with switches 204 and 206. Switch 204 has ports for a trunk from PBX A and a trunk from central office 230. Switch 206 has ports for a trunk from PBX B and a trunk from central office 232. So in Area 200, VNS 202 would be responsible for processing call setups for all calls originating at PBXs A and B and central offices 230 and 232. It would also handle signaling exchange with these same units for calls destined for them from another service area.

Setting up and tearing down SVCs in a multi-service area system is a somewhat involved process. The following description describes what happens on the three main interfaces: PBX or central office trunk to VNS; VNS to VNS; and VNS to switching node.

First, the trunk to VNS interface. For the VNS application, the PBX or central office connects to a wide-area switch through a voice module, which terminates an E1 PRI (Primary Rate Interface). The E1 PRI contains both the bearer channels with user's voice or data and a D channel, the signaling channel. The bearer channels should be routed to the far-end or whichever termination point the user is trying to call. Before that can happen, the network must set up the call or calls. The signaling channel, the D channel, carries the messages to begin the call setup process.

Therefore, the D channel is routed to the VNS responsible for the node to which the PRI is connected. In FIG. 9, VNS 202 has two nodes, local switch 206 and remote switch 204, in its area. PBXs A and B, and central offices 230 and 232, have E1 PRI interfaces terminating on a voice module (i.e., port) in the appropriate switch. In the E1 PRI, the signaling channel, typically timeslot 16 (TS16), is routed to the VNS over a PVC. There is a signaling channel configured (i.e., a PVC added) for every PBX or central office trunk in a VNS's domain.

So in FIG. 9, four PVCs provide signaling channels to VNS 202. Two would be local connections, i.e., DACS connections on local node 206 connecting the voice module connected to VNS 202's E1 NIC to the voice modules connected to PBX B and central office 232, respectively. The other two signaling channels would be from the voice modules on remote node 204 that are connected, respectively, to PBX A and central office 230, to VNS 202's E1 NIC. These PVCs can be carried over an E1 trunk between switches 204 and 206 (remember that an E1 NIC can manage up to 30 signaling PVCs).

The second interface involved is a VNS to VNS interface. In a Voice Network Switching network with multiple domains, every VNS must be able to communicate with every other VNS in the network. This full-mesh topology provides the overlaying signaling plane necessary for the network to route and deliver SVCs. This messaging plane provides flow control mechanisms, so that once a call is admitted, it will be reliably delivered to the destination. (The VNS-to-VNS interface is only required when there are multiple VNS areas.)

In FIG. 9, VNS 202 and VNS 212 are in different service areas. They each preside over their own domain. They are both directly attached to a switch through a Frame Relay Module (FRM). There is a frame relay PVC configured between the two VNSs. When there is a Frame Relay PVC established between the two VNSs, they are considered to be locally adjacent. The VNS serving the calling party passes messages to the locally adjacent VNS serving the called party in order to initiate a connection between service areas. The second VNS may establish an SVC directly to the switch serving the called party.

Finally, a VNS must be able to communicate with its nodes, e.g., the Nodal Processor Module (NPM) contained in each of the switches in its area. The VNS-to-local switching node Ethernet interface provides IP connectivity used for exchanging IP messages between the VNS and both local and remote nodes.

These IP-based messages are exchanged for the following purposes: to exchange circuit build commands and responses; to report circuit/port/card status to the VNS (the VNS needs to be informed of all the interface outages so that it can clear all the calls that go through those interfaces outages); to exchange heartbeat messages (the VNS needs to detect when the node fails or has gone out of service so that the VNS can clear all the calls that go through the downed equipment).

Before the Voice Network Switching network can provide SVCs in response to a call from a PBX, the individual VNSs must be both configured and provisioned.

VNS configuration includes: setting up the VNS for the local environment; configuring PVCs between the PBX and central office E1 PRI's and the VNS; and configuring PVCs between every VNS in the network (this last step is only necessary when there are multiple VNS areas).

Provisioning, which is done mainly through the VNS CLI, includes the following tasks: adding cards to a switch, configuring the cards, and entering the information to the VNS's service database; configuring ports and entering the information in the VNS database; assigning addresses to B channels on the E1 PRI; and propagating new addresses (or prefixes) to other VNSs.

The VNS CLI can also be used to assign address prefixes of up to 30 digits for a VNS area, and individual addresses at a PBX of up to 40 digits. These addresses identify the end-users participating in call attempts as the called party or calling party. These addresses are a telephone-number-like format and assigned according to the VNS-user's numbering plan.

Configured addresses are stored as Address Information records in the VNS Database. These records are displayed in descending order with the largest numerical address displayed first. Thus an Address Information record of 8000 is displayed before 7999 which is displayed before 900, etc.

The VNS can screen addresses, that is, filter calling party and called party numbers. Using the VNS CLI, an operator can create lists of calling party (source addresses) or called party (destination addresses) that will either be allowed or disallowed on a per-PBX-port basis.

The VNS provides address (that is, number) translation to route public network telephone numbers over VNS private networks. This translation feature can be used to translate a public number to a private number for break-in and a private number to a public number for breakout. Number translation is configured with the VNS CLI by providing transformation rules as disclosed above for the single-VNS system. Note that breakout point selection may be performed twice in a multiple service area VNS network. For instance, VNS 222 may know which prefixes are local to service area 200. In reality, some of these prefixes may be local to central office 230 and some may be local to central office 232. When a called party is local to central office 230 or 232, VNS 222 may request that VNS 202 complete the breakout, since service area 200 appears to have a local breakout point, and service area 210, as well as central office 236 in VNS 222's own service area, do not. VNS 202 will then select which of the breakout points in its service area is most desirable, and connects to PSTN 40 through that central office.

The VNS CLI is a series of menus that are used to configure and provision the VNS. When a menu is completed and saved, it becomes a record in the VNS database, which is stored on the VNS disk. An operator can use the VNS CLI to browse the database as well as to modify it.

The VNS creates and stores Call Detail Records (CDRs) for voice (or data) SVCs that it establishes. CDRs are created at the originating-end VNS once a call is set up. A CDR identifies whether a call is a voice or a data call, the calling and called numbers, the local and remote node names, date and timestamp, elapsed time in seconds and Call Failure Class (that is, cause codes). The CDRs are stored in a file and can be retrieved at a fixed interval by a network management system workstation or by any server attached to the Ethernet. The VNS CLI allows an operator to configure CDR File Counts and CDR File Intervals, which define the number of CDR files generated and the interval for which a CDR file will be generated.

The disclosed embodiments presented herein are exemplary. The embodiments can be used with a variety of network protocols, and are appropriate for both LAN and WAN usage. The transport protocols, signaling protocols, control protocols, etc. used in a specific implementation will to some extent depend on the requirements of that implementation. Various other modifications to the disclosed embodiments will be obvious to those of ordinary skill in the art upon reading this disclosure, and are intended to fall within the scope of the invention as claimed.

What is claimed is:

1. A method for interconnecting a private voice network with a public switched telephone network, the method comprising:

connecting a first private branch exchange trunk between a first private branch exchange and a first switch in a wide-area data network;

connecting a first public switched telephone network trunk between the public switched telephone network and a second switch in the wide-area data network;

connecting an adjunct voice network system to the wide-area data network;

provisioning the voice network system to exchange signaling information related to the private branch exchange trunk with the private branch exchange via a first permanent virtual circuit and a signaling protocol recognized by the private branch exchange;

provisioning the voice network system to exchange signaling information related to the public switched telephone network trunk with the public switched telephone network via a second permanent virtual circuit and a public switched telephone network signaling protocol;

detecting, at the voice network system, when the private branch exchange requests that the voice network system complete a call to a number reachable through the public switched telephone network; and when such a call is requested, the voice network system signaling the public switched telephone network to complete the call, and establishing a switched virtual circuit on the wide-area data network to connect the private branch exchange trunk with the public switched telephone network trunk and provide a bearer channel for the call.

2. The method of claim 1, further comprising connecting a second public switched telephone network trunk between the public switched telephone network and a third switch in the wide-area network, provisioning the voice network system to exchange signaling information related to the second public switched telephone network trunk with the public switched telephone network via a third permanent virtual circuit and a public switched telephone network signaling protocol, and, when the private branch exchange requests that the voice network system complete a call to a number reachable through the public switched telephone network, the voice network system:

selecting, based on a pre-defined decision criteria, whether to connect the call through the first public switched network trunk or through the second public switched network trunk;

signaling, over the second or the third permanent virtual circuit as based on the selected public switched network trunk, a request to the public switched telephone network to complete the call; and establishing the switched virtual circuit on the wide-area data network to connect the private branch exchange trunk with the selected public switched network trunk and provide the bearer channel for the call.

3. The method of claim 2, wherein the pre-defined decision criteria comprises evaluating the approximate toll charges that would be incurred by connecting the call through each of the first and second public switched telephone network trunks.

4. The method of claim 3, wherein the approximate toll charges are based at least in part on the approximate location of the selected trunk, the approximate location of the called party, and the time of day of the request to complete a call.

5. The method of claim 2, wherein the pre-defined decision criteria comprises evaluating switch load on the second and third switches.

6. The method of claim 2, wherein the pre-defined decision criteria comprises evaluating trunk load on the first and second public switched telephone network trunks.

7. The method of claim 2, further comprising connecting one or more additional public switched telephone network trunks to switches in the wide-area data network, provisioning the voice network system to exchange signaling information with these additional trunks in like fashion to that provided for the first and second public switched telephone network trunks, and the voice network system considering these additional public switched telephone network trunks during the step of selecting a trunk based on a pre-defined decision criteria.

8. The method of claim 7, further comprising connecting one or more additional private branch exchange trunks to switches in the wide-area data network, provisioning the voice network system to exchange signaling information with these additional private branch exchange trunks in like fashion to that provided for the first private branch exchange trunk, the voice network system performing the detecting, selecting, signaling, and establishing a switched virtual circuit steps for the additional private branch exchange trunks in like fashion to that provided for the first private branch exchange trunk.

9. The method of claim 8, the voice network system also responding to requests originating on a private branch exchange connected to one private branch exchange trunk to complete a call to a private branch exchange connected to another private branch exchange trunk, by signaling the latter private branch exchange to complete the call and establishing a switched virtual circuit on the wide-area data network to connect the two private branch exchange trunks and provide a bearer channel for the call.

10. The method of claim 1, wherein the first switch and the second switch are the same switch.

11. The method of claim 1, further comprising
connecting a second private branch exchange trunk between a second private branch exchange and a third switch in the wide-area network,
provisioning the voice network system to exchange signaling information related to the second private branch exchange trunk with the second private branch exchange via a third permanent virtual circuit and a signaling protocol recognized by the private branch exchange, and,
when the public switched telephone network requests that the voice network system complete a call to a number reachable through one of the private branch exchange trunks, the voice network system:
determining, based on an addressing table, whether the call requests a party reachable through the first or second private branch exchange;
when the party is reachable, signaling, over the first or the third permanent virtual circuit as based on the selected private branch exchange trunk, either the first or the second private branch exchange to complete the call; and
establishing a switched virtual circuit on the wide-area data network to connect the selected private branch exchange trunk with the public switched network trunk and provide a bearer channel for the call.

12. The method of claim 1, wherein the voice network system comprises multiple active voice network appliances, each responsible for its own service area comprising one or more wide-area data network switches, each switch connected to one or more public switched telephone network trunks and/or one or more private branch exchange trunks, each voice network appliance in communication with each other voice network appliance for the purpose of exchanging signaling for calls originating in one service area and terminating in another service area.

13. A method of operating a voice network appliance, the method comprising:
connecting the voice network appliance to a node in a wide-area network;
establishing, for each of two or more wide-area network termination points, a signaling exchange wide-area network circuit between the voice network appliance and that termination point, each termination point terminating either a private branch exchange trunk or a public switched telephone network trunk to a node in the wide-area network;
provisioning an address translator within the appliance to recognize, for call requests originating at each termination point, the called termination point for the called party indicated in the call request; and
when a call request is received from an originating termination point over its associated signaling exchange circuit, determining the appropriate called termination point for the called party indicated in the call request, signaling the call request to the called termination point over its associated signaling exchange circuit, and establishing a switched virtual circuit between the originating and called termination points to provide a bearer channel for the call.

14. The method of claim 13, wherein the signaling protocol used on a signaling exchange circuit for a public switched telephone network trunk termination point is different from the signaling protocol used on a signaling exchange circuit for a private branch exchange trunk termination point, the method further comprising translating signaling between protocols when connecting a private branch exchange trunk to a public switched telephone network trunk.

15. The method of claim 13, further comprising, when two or more termination points are public switched telephone network trunk termination points and a call request is received that requests a connection to a called party reachable over the public switched telephone network, selecting, based on a pre-defined decision criteria, which of the public switched telephone network trunk termination points should be used to connect the call.

16. The method of claim 15, wherein the pre-defined decision criteria comprises evaluating the approximate toll charges that would be incurred by connecting the call through each of the public switched telephone network trunk termination points.

17. The method of claim 16, wherein the approximate toll charges are based at least in part on the approximate location of the public switched telephone network trunk, the approximate location of the called party, and the time of day of the request to complete a call.

18. The method of claim 15, wherein the public switched telephone network trunk termination points are located at wide-area network switches, and wherein the pre-defined decision criteria comprises evaluating switch load on the switches at the respective public switched telephone network trunk termination points.

19. The method of claim 15, wherein the pre-defined decision criteria comprises evaluating trunk load on the public switched telephone network trunks.

20. The method of claim 13, further comprising:
connecting a signaling exchange circuit to a second voice network appliance connected to the wide-area network, the second appliance serving additional termination points;
provisioning the address translator to recognize called termination points that are serviced by the second voice network appliance; and when a call request is received from an originating termination point that requests a called party reachable through a termination point serviced by the second voice network appliance, signaling the call request to the second voice network appliance.

21. A voice network appliance comprising:

a data connection point for connecting the appliance to a wide-area data network;

a signaling unit to exchange call signaling information with one or more private branch exchanges and one or more public switched telephone network central offices, each exchange or office having a trunk connected to the wide-area data network at a corresponding network node known to the appliance, and each trunk having a signaling channel connected to the appliance through a permanent virtual circuit;

a switched circuit manager to establish and manage switched virtual circuits between the network nodes for the purpose of providing bearer channels for calls between the exchange and/or central office trunks connected to those nodes;

a call controller to control call progression by coordinating the functions of the signaling unit and the switched circuit manager; and an address translation unit to receive called party addresses for call requests received by the signaling unit, determine a destination exchange or central office for the call requests, translate the called party addresses into formats understandable by the destination equipment, and supply the translated addresses and destinations to the call controller.

22. The voice network appliance of claim 21, wherein the address translation unit comprises a breakout point selector to select, when more than one public switched telephone network central office is connected to the appliance through a permanent virtual circuit and a call is requested to a called party reachable through the public switched telephone network, a breakout central office for the call request, based on a pre-defined decision criteria, and to indicate the breakout central office as the destination central office for the call request.

23. The voice network appliance of claim 22, wherein the pre-defined decision criteria evaluates the approximate toll charges that would be incurred by connecting the call through each of the central offices.

24. The voice network appliance of claim 23, wherein the approximate toll charges are based at least in part on the approximate location of the central office and the approximate location of the called party.

25. The voice network appliance of claim 22, wherein the pre-defined decision criteria comprises evaluating the load on the network nodes servicing the respective central office trunks.

26. The voice network appliance of claim 22, wherein the pre-defined decision criteria comprises evaluating trunk load on the central office trunks.

27. The voice network appliance of claim 21, wherein the signaling unit also exchanges call signaling information with one or more additional voice network appliances connected to the wide-area data network and exchanging signaling with one or more additional private branch exchanges and/or public switched telephone network central offices, and wherein the address translation unit determines the destination for a call request to one of the additional exchanges or central offices to be the voice network appliance exchanging signaling with that exchange or central office.

28. The voice network appliance of claim 27, the address translation unit having a breakout point selector capable of selecting a breakout point that exchanges signaling with one of the additional voice network appliances.

29. An article of manufacture comprising a computer-readable medium containing a program for operating a voice network appliance connected in a wide-area data network, the program comprising:

a signaling handler to exchange call signaling information with one or more private branch exchanges and one or more public switched telephone network central offices through permanent virtual circuits on the wide-area data network, each exchange or office having a trunk connected to the wide-area data network at a corresponding network node known to the program;

a switched circuit manager to establish and manage switched virtual circuits between the network nodes for the purpose of providing bearer channels for calls between the exchange and/or central office trunks connected to those nodes;

a call controller to control call progression by coordinating the functions of the signaling unit and the switched circuit manager; and an address translator to receive called party addresses for call requests received by the signaling unit, determine a destination exchange or central office for the call requests, translate the called party addresses into formats understandable by the destination equipment, and supply the translated addresses and destinations to the call controller.

* * * * *